United States Patent
Park et al.

(10) Patent No.: US 9,155,042 B2
(45) Date of Patent: Oct. 6, 2015

(54) METHOD FOR OPERATING IN IDLE MODE AND M2M APPARATUS

(75) Inventors: Gi Won Park, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 14/118,827

(22) PCT Filed: Jun. 14, 2012

(86) PCT No.: PCT/KR2012/004687
§ 371 (c)(1),
(2), (4) Date: Nov. 19, 2013

(87) PCT Pub. No.: WO2012/173398
PCT Pub. Date: Dec. 20, 2012

(65) Prior Publication Data
US 2014/0113626 A1  Apr. 24, 2014

Related U.S. Application Data

(60) Provisional application No. 61/497,496, filed on Jun. 15, 2011, provisional application No. 61/503,618, filed on Jul. 1, 2011, provisional application No. 61/506,146, filed on Jul. 10, 2011, provisional application No. 61/509,545, filed on Jul. 19, 2011.

(51) Int. Cl.
*H04W 52/02* (2009.01)
*H04W 68/02* (2009.01)
*H04W 4/00* (2009.01)
*H04W 60/06* (2009.01)

(52) U.S. Cl.
CPC .......... *H04W 52/0212* (2013.01); *H04W 4/005* (2013.01); *H04W 60/06* (2013.01); *H04W 68/02* (2013.01)

(58) Field of Classification Search
CPC .. H04W 52/0212; H04W 60/06; H04W 4/005
See application file for complete search history.

(56) References Cited

U.S. PATENT DOCUMENTS

| | | | |
|---|---|---|---|
| 2010/0004002 A1* | 1/2010 | Hahn et al. | 455/456.1 |
| 2010/0167756 A1 | 7/2010 | Park et al. | |
| 2011/0032899 A1* | 2/2011 | Park et al. | 370/329 |
| 2011/0065467 A1* | 3/2011 | Park et al. | 455/507 |
| 2011/0256883 A1* | 10/2011 | Park et al. | 455/456.1 |
| 2012/0034918 A1* | 2/2012 | Park et al. | 455/435.1 |
| 2013/0058280 A1* | 3/2013 | Kim et al. | 370/328 |

OTHER PUBLICATIONS

Lin Chen, et al., "The Idle Mode Message Cleanup to Support Legacy ASN", IEEE 802.16 Broadband Wireless Access Working Group, IEEE C80216m-10_0721, Jul. 9, 2009.
Jaesun Cha, "Distribution of Initial Ranging Access for Network Reentry", IEEE 802.16 Broadband Wireless Access Working Group, IEEE C802.16p-11/0020, Mar. 6, 2011.
Hyunjeong Kang, et al., "Clean-up for Condition Field in Mode MAC Control Messages (16.2.3.21)", IEEE 802.16 Broadband Wireless Access Working Group, IEEE C802.16m-10/1440r2, Jan. 10, 2010.

* cited by examiner

*Primary Examiner* — Mazda Sabouri
(74) *Attorney, Agent, or Firm* — Dentons US LLP

(57) ABSTRACT

A method for operating in an idle mode and a machine-to-machine (M2M) apparatus are provided. The M2M apparatus receives a deregistration-response (DREG-RSP) message from a base station, and the M2M apparatus in the idle mode monitors a paging advertisement (PAG-ADV) message from the base station. Comprised is a fixed M2M deregistration identifier (FMDID), and the FMDID is a 16-bit identifier for identifying the M2M apparatus in a region of the base station.

12 Claims, 5 Drawing Sheets

METHOD FOR OPERATING IN IDLE MODE AND M2M APPARATUS

This Application is a 35 U.S.C. §371 National Stage Entry of International Application No. PCT/KR2012/004687, filed Jun. 14, 2012 and claims the benefit of U.S. Provisional Application Nos. 61/497,496, filed Jun. 15, 2011, 61/503,618, filed Jul. 1, 2011, 61/506,146, filed Jul. 10, 2011 and 61/509,545, filed Jul. 19, 2011, all of which are incorporated by reference in their entirety herein.

BACKGROUND OF THE INVENTION

1. Field of the Invention

The present invention relates to wireless communications, and more particularly, to a method and apparatus for operating in an idle mode for machine to machine (M2M) communication in a wireless communication system.

2. Related Art

Machine to machine (M2M) communication is one type of data communication including one or more entities not requiring human interactions, and is also called machine type communication (MTC). That is, the M2M communication refers to the concept of communication based on the existing wireless communication network used by a mechanical device instead of a Mobile Station (MS) used by a user. The mechanical device used in the M2M communication can be called an M2M device. There are various M2M devices such as a vending machine, a machine for measuring a water level at a dam, etc.

The M2M device has a feature different from that of a typical MS. Therefore, a service optimized to the M2M communication may differ from a service optimized to human type communication (HTC) communication. In comparison with a current mobile network communication service, the M2M communication can be characterized as a different market scenario, data communication, less costs and efforts, a potentially great number of M2M devices, wide service areas, low traffic per M2M device, etc.

Low power consumption is one of requirements of the M2M device. In a mobile communication network, an idle mode which is a low-power mode is provided to decrease power consumption of the MS. However, an operation of the existing idle mode may not be optimized to the M2M device. For example, one of features of the M2M device is that the M2M device is fixed. Therefore, the operation of the existing idle mode which considers a wide-range movement of the MS cannot be optimized to the M2M device. There is a need for an operation of an idle mode capable of decreasing a signaling overhead and providing increased power saving.

SUMMARY OF THE INVENTION

The present invention provides a method for operating in an idle mode in which paging is possible in a domain of a base station, and a machine to machine (M2M) device using the method.

In an aspect, a method for operation of a machine-to-machine (M2M) device in an idle mode is provided. The method includes receiving, by a M2M device, a deregistration-response (DREG-RSP) message from a base station, the DREG-RSP message including a fixed M2M deregistration identifier (FMDID) which is a 16-bit identifier that uniquely identifies the M2M device in domain of the base station, entering, by the M2M device, an idle mode, and monitoring, by the M2M device in the idle mode, a paging advertisement (PAG-ADV) message from the base station, the PAG-ADV message including the FMDID.

The method may further include transmitting, by the M2M device, a deregistration-request (DREG-REQ) message to the base station.

The DREG-RSP message may be received as a response of the DREG-REQ message.

The DREG-REQ message may be transmitted as a response of the DREG-RSP message.

The DREG-RSP message may include a mode flag which indicates that the M2M device enters a normal idle mode or a localized idle mode.

The mode flag may be set to '1' when the M2M device enters the localized idle mode.

The FMDID may be included in the DREG-RSP message when the M2M device enters the localized idle mode.

In another aspect, a device for machine-to-machine (M2M) communication includes a radio frequency unit configured to transmit a radio signal, and a processor operably coupled with the radio frequency unit and configured to receive a deregistration-response (DREG-RSP) message from a base station, the DREG-RSP message including a fixed M2M deregistration identifier (FMDID) which is a 16-bit identifier that uniquely identifies the device in domain of the base station, enter an idle mode, and monitor a paging advertisement (PAG-ADV) message from the base station, the PAG-ADV message including the FMDID.

In another aspect, a base station for machine-to-machine (M2M) communication includes a radio frequency unit configured to transmit a radio signal, and a processor operably coupled with the radio frequency unit and configured to instruct the radio frequency unit to transmit a deregistration-response (DREG-RSP) message to a M2M device, the DREG-RSP message including a fixed M2M deregistration identifier (FMDID) which is a 16-bit identifier that uniquely identifies the M2M device in domain of the base station, instruct the radio frequency unit to transmit a paging advertisement (PAG-ADV) message to the M2M device in an idle mode, the PAG-ADV message including the FMDID.

A signaling overhead can be decreased when operating in an idle mode.

DESCRIPTION OF EXEMPLARY EMBODIMENTS

Hereinafter, various message formats are provided in a table form. However, a name of a field, the number of bits of the field, and a description of the field in each table are for exemplary purposes only, and can be easily modified by those ordinarily skilled in the art. In addition, not all of the proposed fields are necessary. In the message, some fields may be omitted, or any field may be added.

Figure 1:
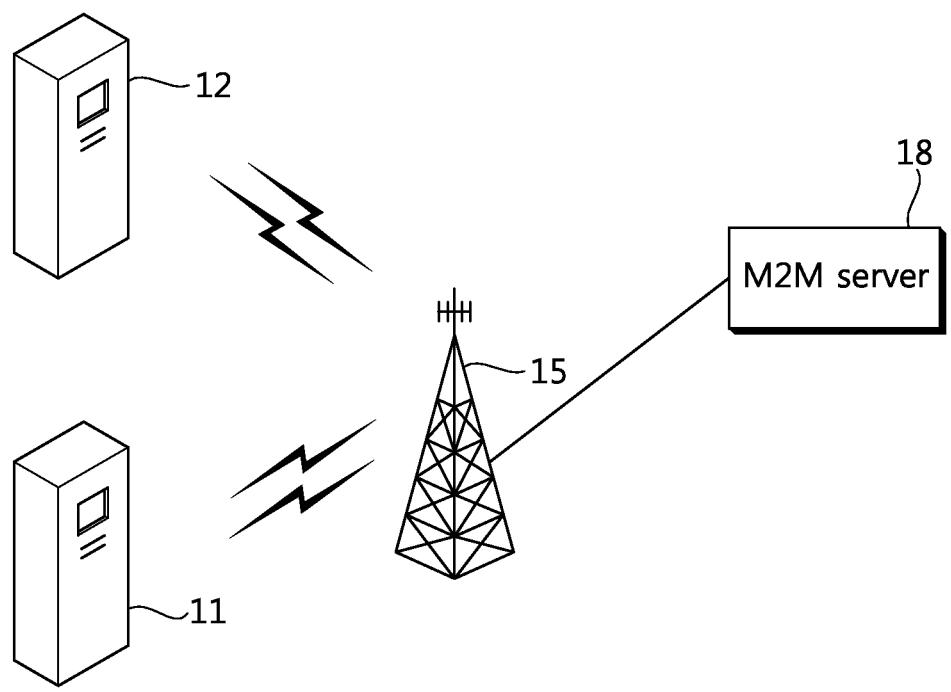
FIG. 1 shows an example of machine to machine (M2M) communication.

FIG. 1 shows an example of machine to machine (M2M) communication.

The M2M communication refers to information exchange between M2M devices 11 and 12 via a base station (BS) 15 without human interactions or information exchange between the M2M device 11 and an M2M server 18 via the BS.

The M2M server 18 is an entity for communicating with the M2M device 11. The M2M server executes an M2M application, and provides an M2M-specific service to the M2M device 11.

The M2M device 11 is a wireless device for providing the M2M communication, and may be fixed or mobile.

A service provided using the M2M communication is differentiated from the existing communication service requiring human intervention, and its service range is various, such as tracking, metering, payment, medical field services, remote controlling, etc.

Representative examples of individual service requirements of M2M features are as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) Priority alarm message (PAM) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing MS identifiers, and thus an M2M group identifier (MGID) is defined.

The MGID is a 12-bit value that uniquely identifies a multicast service flow shared by a group of M2M devices within an M2M group zone. The M2M group zone is a logical zone including one or more BSs. An M2M group zone is identified by an M2M group zone index. The MGID is assigned during dynamic service addition (DSA) procedure. The M2M device retains the MGID even in the idle state unless the M2M device exits from the network and thus a service flow is deleted.

Now, the idle mode operation in an IEEE 802.16m-based system will be described with reference to IEEE (Institute of Electrical and Electronics Engineers) P802.16m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention is also applicable to various wireless communication systems such as 3rd generation partnership project (3GPP) long term evolution (LTE).

Figure 2:
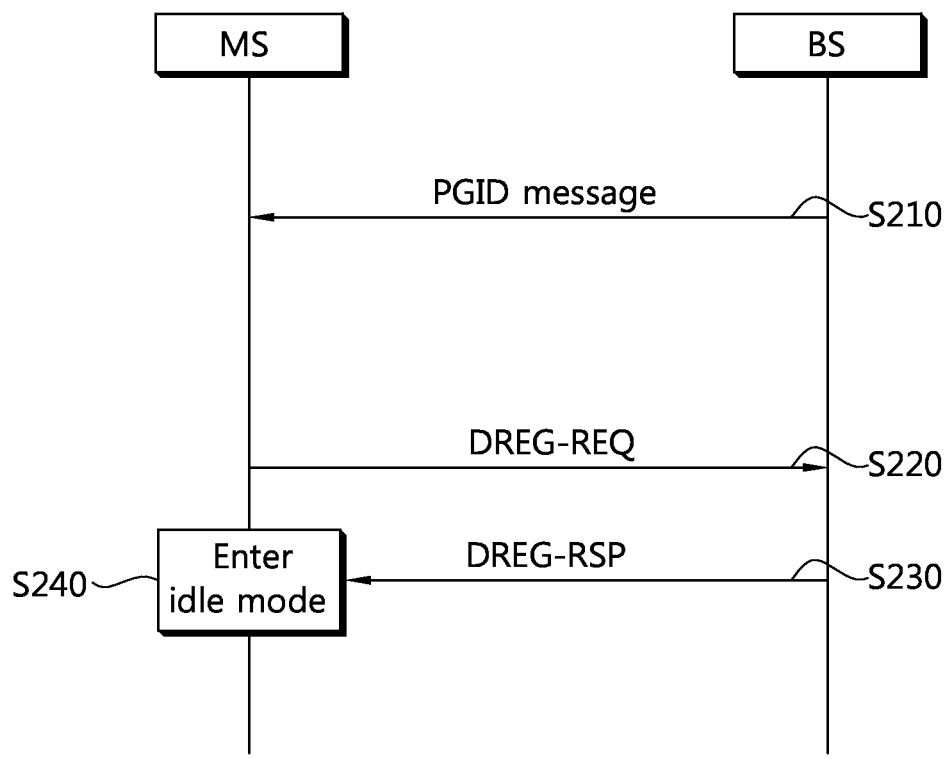
FIG. 2 shows an operation in the existing idle mode.

FIG. 2 shows an operation in the existing idle mode.

A mobile station (MS) receives a paging group identification (PGID) message from a base station (BS) (step S210).

The PGID message is used to advertise a paging group supported by the BS. The PGID message includes a PGID to which the BS belongs.

More specifically, the PGID message has the following format for example.

TABLE 1

| Field | Size (bits) | Description |
|---|---|---|
| For(i=0;i<Num_PGIDs;i++){ | | |
| PGID | 16 | Identifier of paging group to which BS belongs |
| m | 2 | Hash parameters 1 to 4 |
| } | | |

A hash parameter 'm' is used to determine a paging frame at which the UE monitors the paging message. An index of the paging frame is an index of a superframe which satisfies an equation 'deregistration identifier (DID) mod m'.

The MS which intends to enter the idle mode sends a deregistration-request (DREG-REQ) message to the BS (step S220). An action code value of the DREG-REQ message may be '0x01', and the DREG-REQ message may have the following format for example.

TABLE 2

| Field | Size (bits) | Description |
|---|---|---|
| action code | 3 | It is used to indicate purpose of this message. 0x01: idle mode start request |
| paging cycle request | 4 | Paging cycle requested by MS |

The BS sends a deregistration-response (DREG-RSP) message in response to the DREQ-REQ message (step S230). An action code value of the DREG-RSP message may be '0x07', and the DREG-RSP message may have the following format for example.

TABLE 3

| Field | Size (bits) | Description |
|---|---|---|
| action code | 4 | It is used to indicate purpose of this message. 0x07: Response for DREG-REQ |
| paging cycle | 4 | |
| paging offset | 12 | |
| PC ID | 48 | Identifier of paging controller (PC) which retains idle mode information of MS |
| PG ID | 16 | Identifier of paging group (PG) to which MS belongs |
| DID | 18 | Identifier for identifying MS |

A DID is an identifier for identifying an MS in an idle mode in a corresponding paging group, and is allocated by the PC.

Upon receiving the DREG-RSP message, the MS enters the idle mode (step S240).

The aforementioned conventional idle mode premises that idle mode information is managed for each paging group by the PC in consideration of mobility of the MS.

A fixed M2M device does not have mobility, and is not necessarily managed for each paging group. However, according to the existing message structure, at least 82-bit identifiers (i.e., a 48-bit PD IC, a 16-bit PG ID, and a 18-bit DID) need to be exchanged to manage the MS for each paging group.

The present invention proposes to perform paging management of the fixed M2M device not by the PC but by the BS. Since the M2M device operates in the idle mode in a domain of the BS, it is proposed to allocate a unique identifier to the M2M device in the domain of the BS.

Figure 3:
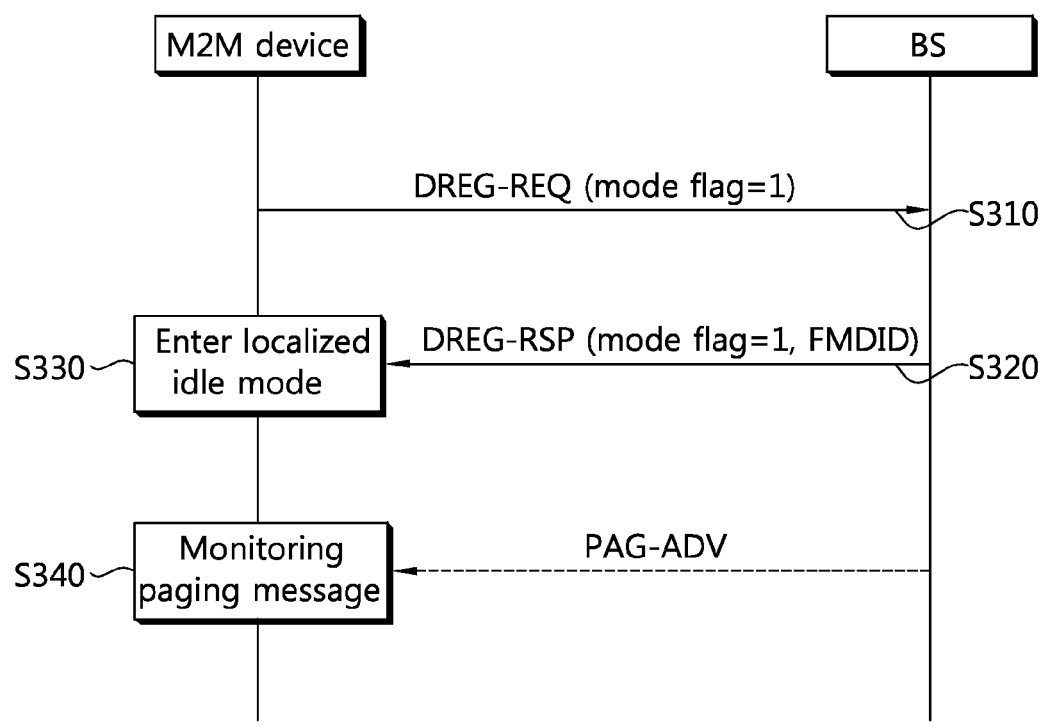
FIG. 3 shows an idle mode operation according to an embodiment of the present invention.

FIG. 3 shows an idle mode operation according to an embodiment of the present invention. This is an example in which an M2M device enters an idle mode at the request of the M2M device.

The M2M device transmits a DREG-REQ message to a BS (step S310).

The DREG-REQ message has the following format for example.

TABLE 4

| Field | Size (bits) | Description |
| --- | --- | --- |
| action code | 3 | It is used to indicate purpose of this message.<br>0x01: idle mode start request<br>0x02: Response for DREG-RSP by BS |
| mode flag | 1 | 0: M2M device enters normal idle mode<br>1: M2M device enters localized idle mode |

Assume that the M2M device transmits to the BS a DREG-REQ message of which an action code is '0x01' and a mode flag is '1'.

The mode flag indicates either a normal idle mode or a localized idle mode. The normal idle mode is when the idle mode operation is managed by the PC in the same manner as the conventional technique. The localized idle mode is when the idle mode operation is managed by the BS.

The BS transmits a DREG-RSP message to the M2M device in response to the DREG-REQ message (step S320).

The DREG-REQ message has the following format for example.

TABLE 5

| Field | Size (bits) | Description |
| --- | --- | --- |
| action code | 4 | It is used to indicate a purpose of this message.<br>0x05: Instruct M2M device to start idle mode<br>0x07: Response for DREG-REQ |
| mode flag | 1 | 0: M2M device enters normal idle mode<br>1: M2M device enters localized idle mode |
| paging cycle | 4 | |
| paging offset | 12 | |
| PC ID | 48 | Present in normal idle mode |
| PG ID | 16 | Present in normal idle mode |
| DID | 18 | Present in normal idle mode |
| FMDID | 16 | Present in localized idle mode |

A fixed M2M deregistration identifier (FMDID) is a 16-bit identifier used to uniquely identify the M2M device in the domain of the BS. The FMDID is allocated to the M2M device during an idle mode entry, and is released during a network reentry.

Since the FMDID is an identifier in the domain of the BS, the number of bits of the FMDID may be less than the number of bits of a DID which is an identifier in a paging group. Although the number of bits of the FMDID is 16 for example, the number of bits may be less than 16.

In order to allow to enter the localized idle mode, the BS may send to the M2M device a DREG-RSP message including an action code '0x07', a mode flag '1', and the FMDID. When it is allowed to enter the localized idle mode, the BS may not report to the PC that the M2M device intends to enter the idle mode.

Upon receiving the DREG-RSP message, the M2M device may enter the localized idle mode (step S330). On the other hand, upon receiving the DREG-RSP message having a mode flag '0', the M2M device may enter the normalized idle mode.

During the paging cycle in the localized idle mode, the M2M device monitors reception of a paging-advertisement (PAG-ADV) (step S340). An index of the paging frame may be an index of a superframe satisfying an equation of 'FMDID mod m'.

To perform paging on the M2M device, the PAG-ADV message may include the FMDID. Alternatively, the PAG-ADV message may perform group paging by including an MGID.

A PC ID and a PG ID are not included in the DREG-RSP message when entering the idle mode, and thus a payload of the DREG-RSP message can be decreased. In addition, by using a 16-bit FMDID instead of a 18-bit DID, payloads of the DREG-RSP message and PAG-ADV message can be decreased.

Figure 4:
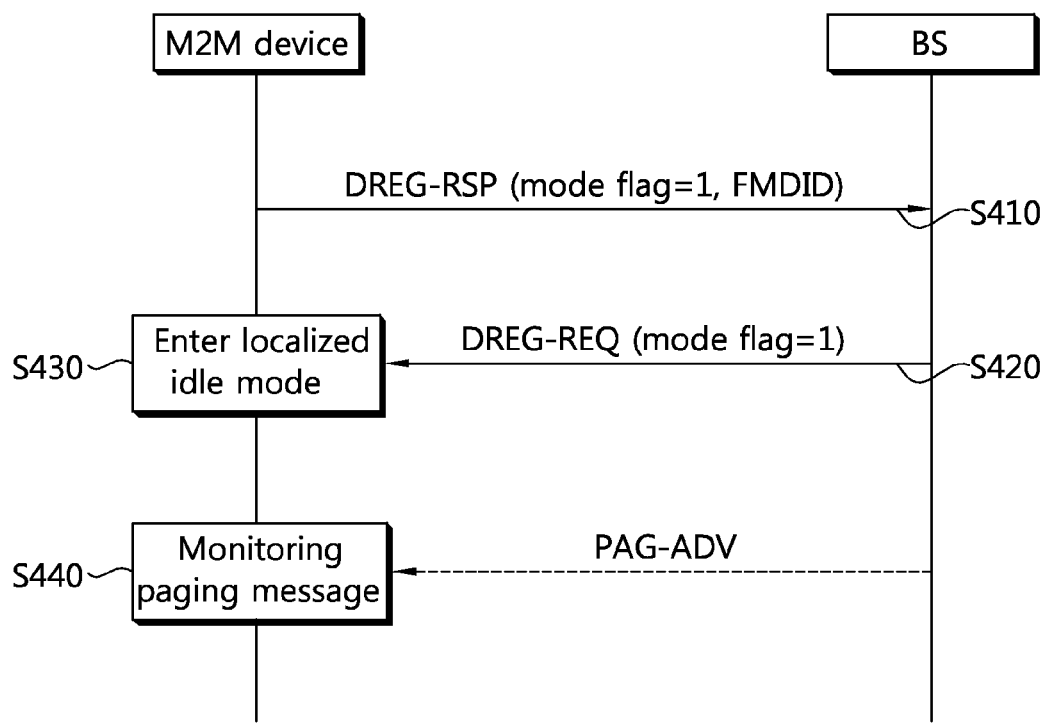
FIG. 4 shows an idle mode operation according to another embodiment of the present invention.

FIG. 4 shows an idle mode operation according to another embodiment of the present invention. In comparison with the embodiment of FIG. 3, this is an example in which an M2M device enters an idle mode at the instruction of a BS.

The BS transmits to the M2M device a DREG-RSP message instructing to enter the idle mode (step S410). The DREG-RSP message includes an action code '0x05', a mode flag '1', and an FMDID.

The M2M device transmits a DREG-REQ message to the BS in response to the REG-RSP message (step S420). As the REG-REQ message is transmitted, the M2M device enters the idle mode (step S430). When the M2M device enters a localized idle mode, a mode flag of the DREG-REQ message is set to '1'. When the M2M device enters a normal idle mode, the mode flag of the DREQ-REQ message is set to '0'.

During the paging cycle in the idle mode, the M2M device monitors reception of the PAG-ADV message (step S440).

Figure 5:
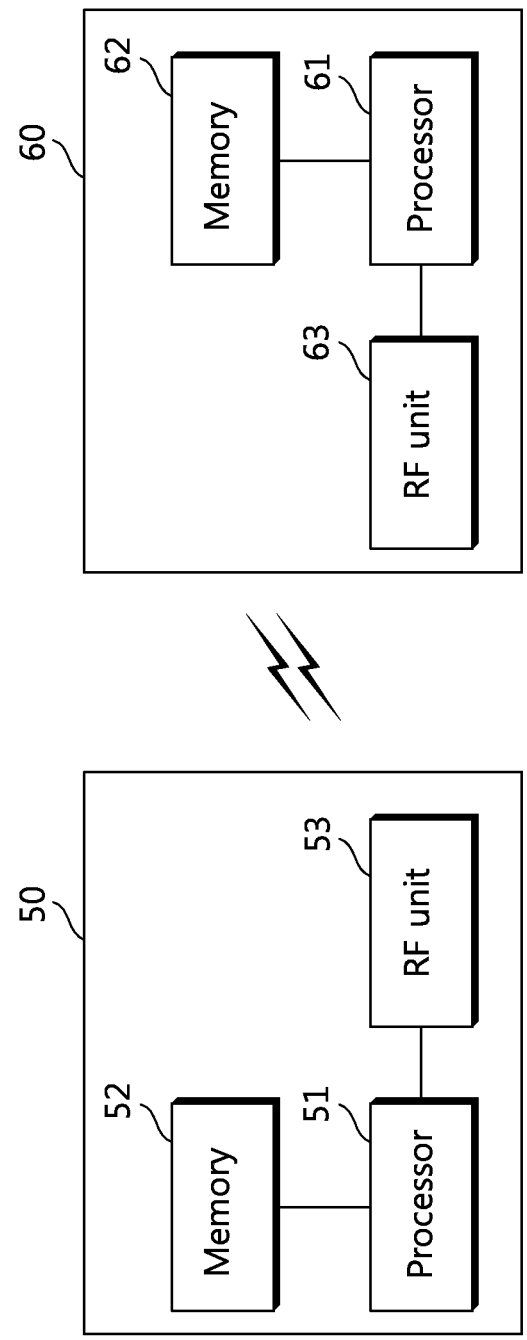
FIG. 5 is a block diagram showing a wireless communication system according to an embodiment of the present invention.

FIG. 5 is a block diagram showing a wireless communication system according to an embodiment of the present invention. A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. In the aforementioned embodiments of FIGS. 3 and 4, the operation of the BS can be implemented by the processor 51. The processor 51 transmits a DREG-RSP message and/or a PAG-ADV message.

An M2M device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes and/or methods. In the aforementioned embodiments of FIGS. 3 and 4, the operation of the M2M device can be implemented by the processor 61. The processor 61 transmits a DREG-REQ message, and monitors a PAG-ADV message.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operation of a machine-to-machine (M2M) device in an idle mode, comprising:
    receiving, by a M2M device, a deregistration-response (DREG-RSP) message from a base station, the DREG-RSP message including a fixed M2M deregistration identifier (FMDID) which is a 16-bit identifier that uniquely identifies the M2M device in domain of the base station;
    entering, by the M2M device, an idle mode; and
    monitoring, by the M2M device in the idle mode, a paging advertisement (PAG-ADV) message from the base station, the PAG-ADV message including the FMDID,
    wherein the DREG-RSP message includes a mode flag which indicates that the M2M device enters a normal idle mode or a localized idle mode.

2. The method claim 1, further comprising:
    transmitting, by the M2M device, a deregistration-request (DREG-REQ) message to the base station.

3. The method of claim 2, wherein the DREG-RSP message is received as a response of the DREG-REQ message.

4. The method of claim 2, wherein the DREG-REQ message is transmitted as a response of the DREG-RSP message.

5. The method of claim 1, wherein the mode flag is set to '1' when the M2M device enters the localized idle mode.

6. The method of claim 5, wherein the FMDID is included in the DREG-RSP message when the M2M device enters the localized idle mode.

7. The method of claim 6, wherein the DREG-RSP message includes a paging controller identifier, a paging group identifier and a deregistration identifier when the M2M device enters the normal idle mode.

8. The method of claim 1, wherein the PAG-ADV message further includes an action code indicating to perform a network reentry, and wherein the FMDID is released during the network reentry.

9. A device for machine-to-machine (M2M) communication, comprising:
    a radio frequency unit configured to transmit a radio signal;
    a processor operably coupled with the radio frequency unit and configured to:
    receive a deregistration-response (DREG-RSP) message from a base station, the DREG-RSP message including a fixed M2M deregistration identifier (FMDID) which is a 16-bit identifier that uniquely identifies the device in domain of the base station;
    enter an idle mode; and
    monitor a paging advertisement (PAG-ADV) message from the base station, the PAG-ADV message including the FMDID,
    wherein the DREG-RSP message includes a mode flag which indicates that the device enters a normal idle mode or a localized idle mode.

10. The device of claim 9, wherein the processor is configured to instruct the radio frequency unit to transmit a deregistration-request (DREG-REQ) message to the base station.

11. The device of claim 9, wherein the mode flag is set to '1' when the device enters the localized idle mode, and the FMDID is included in the DREG-RSP message when the device enters the localized idle mode.

12. A base station for machine-to-machine (M2M) communication, comprising:
    a radio frequency unit configured to transmit a radio signal;
    a processor operably coupled with the radio frequency unit and configured to:
    instruct the radio frequency unit to transmit a deregistration-response (DREG-RSP) message to a M2M device, the DREG-RSP message including a fixed M2M deregistration identifier (FMDID) which is a 16-bit identifier that uniquely identifies the M2M device in domain of the base station;
    instruct the radio frequency unit to transmit a paging advertisement (PAG-ADV) message to the M2M device in an idle mode, the PAG-ADV message including the FMDID,
    wherein the DREG-RSP message includes a mode flag which indicates that the M2M device enters a normal idle mode or a localized idle mode.

* * * * *